United States Patent
Shukla et al.

(10) Patent No.: US 12,512,180 B2
(45) Date of Patent: Dec. 30, 2025

(54) METHOD AND SYSTEM FOR REPAIRING A DYNAMIC RANDOM ACCESS MEMORY (DRAM) OF MEMORY DEVICE

(71) Applicant: Samsung Electronics Co., Ltd., Suwon-si (KR)

(72) Inventors: Nidhi Shukla, Bengaluru (IN); Preeti Joseph, Bengaluru (IN); Hyunbum Cho, Bengaluru (IN); Yongjae Shin, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/614,954

(22) Filed: Mar. 25, 2024

(65) Prior Publication Data
US 2024/0330133 A1    Oct. 3, 2024

(30) Foreign Application Priority Data

Mar. 31, 2023  (IN) .............................. 202341024852
Aug. 31, 2023  (IN) .............................. 202341024852

(51) Int. Cl.
*G11C 29/00*    (2006.01)
*G06F 11/20*    (2006.01)

(52) U.S. Cl.
CPC .......... *G11C 29/76* (2013.01); *G06F 11/2094* (2013.01)

(58) Field of Classification Search
None
See application file for complete search history.

(56) References Cited

U.S. PATENT DOCUMENTS

| | | | | |
|---|---|---|---|---|
| 5,406,565 | A | * | 4/1995 | MacDonald .......... G11C 29/76 714/711 |
| 6,236,602 | B1 | | 5/2001 | Patti |
| 6,373,758 | B1 | * | 4/2002 | Hughes .................. G11C 29/72 365/201 |

(Continued)

OTHER PUBLICATIONS

Extended European Search Report for European Patent Application No. 24167491.0 dated Jul. 24, 2024.

(Continued)

*Primary Examiner* — Daniel F. McMahon
(74) *Attorney, Agent, or Firm* — Harness, Dickey & Pierce, P.L.C.

(57) ABSTRACT

Various example embodiments are directed to a method, device, and system for repairing a Dynamic Random Access Memory (DRAM) memory device. The method includes reserving a memory space within the DRAM memory device, the reserved memory space including a plurality of spare rows, identifying one or more faulty rows within the DRAM memory device using at least one memory testing method, updating an error information table based on information of a respective classified correctable faulty row, in response to an error count for the respective classified correctable faulty row exceeding a desired threshold value, mapping the respective classified correctable faulty row to an available spare row of the plurality of spare rows, storing the mapping of the respective correctable faulty row and the mapped spare row in a row repair translation table, and copying data stored in the respective correctable faulty row into the mapped spare row.

19 Claims, 7 Drawing Sheets

(56) References Cited

U.S. PATENT DOCUMENTS

| | | | |
|---|---|---|---|
| 6,408,401 B1* | 6/2002 | Bhavsar | G11C 29/006 |
| | | | 714/6.32 |
| 9,406,403 B2* | 8/2016 | Loh | G11C 29/76 |
| 10,468,118 B2 | 11/2019 | Walton et al. | |
| 10,776,227 B2 | 9/2020 | Kim et al. | |
| 2002/0108073 A1* | 8/2002 | Hughes | G11C 29/44 |
| | | | 714/6.32 |
| 2002/0120887 A1* | 8/2002 | Hughes | G11C 15/00 |
| | | | 714/42 |
| 2015/0199234 A1* | 7/2015 | Choi | G11C 29/4401 |
| | | | 714/764 |
| 2015/0261632 A1 | 9/2015 | Kim et al. | |
| 2017/0308447 A1* | 10/2017 | Wu | G11C 29/44 |
| 2018/0247699 A1* | 8/2018 | Pope | G11C 29/24 |
| 2019/0237154 A1 | 8/2019 | Choi | |
| 2020/0133517 A1* | 4/2020 | Shah | G06F 11/076 |
| 2020/0321071 A1 | 10/2020 | Varadarajan et al. | |
| 2021/0124639 A1 | 4/2021 | Zhang et al. | |
| 2021/0191829 A1* | 6/2021 | Muthiyalu | G11C 29/84 |
| 2022/0293207 A1* | 9/2022 | Benedict | G11C 29/4401 |

OTHER PUBLICATIONS

Indian Office Action issued Sep. 26, 2025 for corresponding Indian Application No. 202341024852.

Dae-Hyun Kim et al., "An ECC-Assisted Postpackage Repair Methodology in Main Memory Systems", IEEE Transactions on Very Large Scale Integration (VLSI) Systems, vol. 25, Issue No. 7, Mar. 22, 2017.

* cited by examiner

METHOD AND SYSTEM FOR REPAIRING A DYNAMIC RANDOM ACCESS MEMORY (DRAM) OF MEMORY DEVICE

CROSS-REFERENCE TO RELATED APPLICATION

This U.S. non-provisional application claims the benefit of priority under 35 U.S.C. § 119 to Indian Provisional Application No. 202341024852, filed on Mar. 31, 2023 and Indian Non-Provisional application No. 202341024852 filed on Aug. 31, 2023, the disclosures of each of which are incorporated by reference herein in their entireties.

BACKGROUND

Various example embodiments of the inventive concepts generally relate to memory devices. Particularly, one or more example embodiments of the inventive concepts relate to memory failure management of a memory device, methods, and/or systems for repairing a Dynamic Random Access Memory (DRAM) of a memory device.

Generally, memory failures are a common cause of server failures. In other words, the memory failures can be a source of system crash and customer dissatisfaction, unless they are reduced, prevented and/or managed properly. A modern Dynamic Random Access Memory (DRAM), such as a Double Data Rate 5 (DDR5) RAM, is equipped with error-identifying techniques to identify and/or correct memory errors (e.g., correctable errors and uncorrectable errors). The error identification techniques may include an On-die Error Correction Code (ECC) and a sideband ECC. The On-die ECC is a feature and/or technique designed to correct bit errors within the DRAM and protect the integrity of data stored in memory cells of DRAM arrays. Although the On-die ECC technique is used to correct bit errors, it does not provide end-to-end protection. Further, the On-die ECC technique does not detect, reduce, and/or prevent errors that occur during data transmission between a memory controller and a memory module. To provide full end-to-end protection, the On-die ECC may be used in conjunction with sideband ECC.

The sideband ECC is an error identifying technique implemented in all devices using standard DDR memories (for example, DDR4, DDR5, etc.). In sideband ECC, an error correction code is sent as sideband data along with actual data to the DRAM. During write/read operation, a memory controller of the DRAM may write/read the error correction code along with the actual data. No additional write or read overhead commands are desired and/or required for sideband ECC technique.

Further, an error correction technique, such as Post Package Repair (PPR), etc., may be used to correct the detected errors. The PPR is a memory self-healing process of substituting access to a bad cell and/or faulty row with a spare row within the DRAM. The PPR may comprise using a Reliability Availability and Serviceability (RAS) feature wherein a Dual In-line Memory Module (DIMM) with errors (for example, a faulty row) may be repaired after packaging. The PPR may map faulty rows encountered dynamically to at least one spare row of a plurality of available spare rows. The PPR fuses a faulty row with the spare row permanently or temporarily based on the type of PPR. If the PPR fuses the faulty row with the spare row permanently, then the PPR is known as hard PPR, and if the PPR fuses the faulty row with the spare row temporarily, then the PPR is known as soft PPR. It may be noted that the number of spare rows available in a system for hard PPR is limited, and for example, the PPR may have one spare row per bank group. Once hard PPR is performed, the same faulty row will always be mapped to the same spare row. If more errors occur then PPR may not be able to correct the errors and hence, the errors may become potential hard errors (e.g., permanent errors). A sparing technique may be used to detect and correct such errors. In the context of memory devices, sparing may refer to substituting a faulty memory element with a spare or redundant memory element. The sparing is performed on an entire Rank/DIMM/Channel of the DRAM. The sparing enables an entire faulty Rank/DIMM/Channel to be replaced by a redundant Rank/DIMM/Channel. In these scenarios a complete Rank/DIMM/Channel becomes unused, and in case of another row becoming faulty there will be no spare memory for repairing the faulty row.

Thus, there exists a need for further improvements in DRAM repairing techniques.

SUMMARY

One or more shortcomings discussed above may be overcome and/or additional advantages may be provided by at least one example embodiment of the inventive concepts.

At least one object of at least one example embodiment of the inventive concepts is to increase the number of spare rows by reserving memory in DRAM of a memory device.

According to at least one example embodiment of the inventive concepts, methods, apparatuses, and/or computer readable media are provided for repairing a Dynamic Random Access Memory (DRAM) memory device.

At least one example embodiment of the inventive concepts discloses a method of repairing the DRAM memory device. The method comprises reserving a memory space within the DRAM memory device, the reserved memory space including a plurality of spare rows, identifying one or more faulty rows within the DRAM memory device using at least one memory testing method, classifying the identified one or more faulty rows into correctable faulty rows and uncorrectable faulty rows, and repairing each of the classified correctable faulty rows by, updating an error information table based on information of a respective classified correctable faulty row, the error information table including a row identifier corresponding to the respective classified correctable faulty row and an error count for the respective classified correctable faulty row, in response to the error count for the respective classified correctable faulty row exceeding a desired threshold value, mapping the respective classified correctable faulty row to an available spare row of the plurality of spare rows, storing the mapping of the respective correctable faulty row and the mapped spare row in a row repair translation table, and copying data stored in the respective correctable faulty row into the mapped spare row.

At least one example embodiment of the inventive concepts discloses a method of repairing a Dynamic Random-Access memory (DRAM) memory device. The method comprises reserving a memory space within the DRAM memory device, wherein the reserved memory space comprises a plurality of spare rows. Further, the method comprises identifying one or more faulty rows within the DRAM using at least one memory testing method. Furthermore, the method comprises repairing the identified one or more faulty rows. The identified one or more faulty rows are repaired by mapping the identified one or more faulty rows with corresponding available spare rows of the plurality of spare rows and copying data of the identified one or more faulty rows into the corresponding available spare rows of the plurality of spare rows.

At least one example embodiment of the inventive concepts discloses a system for repairing a Dynamic Random Access Memory (DRAM) memory device. The system comprises DRAM memory and at least one processor communicatively coupled with the DRAM memory. The processor is configured to reserve a memory space within the DRAM memory, the reserved memory space including a plurality of spare rows, identify one or more faulty rows within the DRAM memory using at least one memory testing method, classify the identified one or more faulty rows into correctable faulty rows and uncorrectable faulty rows, and repair each of the classified correctable faulty rows by, updating an error information table based on information of a respective classified correctable faulty row, the error information table including an identifier corresponding to the respective classified correctable faulty row and an error count for the respective classified correctable faulty row, in response to the error count for the respective classified correctable faulty row exceeding a desired threshold value, mapping the respective classified correctable faulty row to an available spare row of the plurality of spare rows, storing the mapping of the respective classified correctable faulty row and the mapped spare row in a row repair translation table, and copying data stored in the respective classified correctable faulty row into the mapped spare row.

At least one example embodiment of the inventive concepts discloses a system for repairing a Dynamic Random Access Memory (DRAM) memory device. The system comprises a DRAM memory and a processor communicatively coupled with the memory. The processor is configured to reserve a memory space within the DRAM, wherein the reserved memory space comprises a plurality of spare rows. Further, the processor is configured to identify one or more faulty within the DRAM using at least one memory testing method. Furthermore, the processor is configured to repair the identified one or more faulty rows. The identified one or more faulty rows are repaired by mapping the identified one or more faulty rows with corresponding available spare rows of the plurality of spare rows and copying data of the identified one or more faulty rows into the corresponding available spare rows of the plurality of spare rows.

At least one example embodiment of the inventive concepts discloses a non-transitory computer-readable medium storing computer readable instructions executable by at least one processor to cause the at least one processor to reserve a memory space within the DRAM memory device, the reserved memory space including a plurality of spare rows, identify one or more faulty rows within the DRAM memory device using at least one memory testing method, classify the identified one or more faulty rows into correctable faulty rows and uncorrectable faulty row, and repair each of the classified correctable faulty rows by, updating an error information table based on information of a respective classified correctable faulty row, the error information table including an identifier corresponding to the respective classified correctable faulty row and an error count for the respective classified correctable faulty row, in response to an error count for the respective classified correctable faulty row exceeding a desired threshold value, mapping the respective classified correctable faulty row with an available spare row of the plurality of spare rows, storing the mapping of the respective classified correctable faulty row and the mapped spare row in a row repair translation table, and copying data stored in the correctable faulty row into the mapped spare row.

At least one example embodiment of the inventive concepts discloses a non-transitory computer-readable medium storing computer readable instructions executable by a processor to cause the processor to reserve a memory space within the DRAM of the memory device, wherein the reserved memory space comprises a plurality of spare rows. Further, the processor is configured to identify one or more faulty rows within the DRAM using at least one memory testing method. Furthermore, the processor is configured to repair the identified one or more faulty rows. The identified one or more faulty rows are repaired by mapping the identified one or more faulty rows with corresponding available spare rows of the plurality of spare rows and copying data of the identified one or more faulty rows into the corresponding available spare rows of the plurality of spare rows.

At least one example embodiment of the inventive concepts discloses a method of repairing a Dynamic Random Access Memory (DRAM) memory device. The method comprises reserving a memory space within the DRAM memory device, the reserved memory space including a plurality of spare rows, identifying one or more faulty rows within the DRAM memory device using at least one memory testing method, and repairing the identified one or more faulty rows by, mapping the identified one or more faulty rows with one or more corresponding available spare rows of the plurality of spare rows, and copying data stored in the identified one or more faulty rows into the one or more mapped spare rows.

At least one example embodiment of the inventive concepts discloses a system for repairing a Dynamic Random Access Memory (DRAM) memory device, the system comprises DRAM memory and at least one processor communicatively coupled to the DRAM memory. The at least one processor is configured to reserve memory space within the DRAM memory, the reserved memory space including a plurality of spare rows, identify one or more faulty rows within the DRAM memory using at least one memory testing method, and repair the identified one or more faulty rows by, mapping the identified one or more faulty rows with one or more corresponding available spare rows of the plurality of spare rows, and copying data stored in the identified one or more faulty rows into the one or more mapped spare rows.

At least one example embodiment of the inventive concepts discloses a non-transitory computer readable medium for repairing a Dynamic Random Access Memory (DRAM) memory device. The non-transitory computer readable medium comprises one or more computer readable instructions which, when executed by at least one processor causes the processor to reserve a memory space within the DRAM memory device, the reserved memory space including a plurality of spare rows, identify one or more faulty rows within the DRAM memory device using at least one memory testing method, and repair the identified one or more faulty rows by, mapping the identified one or more faulty rows with one or more corresponding available spare rows of the plurality of spare rows, and copying data stored in the identified one or more faulty rows into the one or more mapped spare rows.

BRIEF DESCRIPTION OF DRAWINGS

Further aspects and advantages of various example embodiments of the inventive concepts will be readily understood from the following detailed description with reference to the accompanying drawings. Reference numerals have been used to refer to identical or functionally similar elements. The figures together with a detailed description below are incorporated in and form part of the specification and serve to further illustrate the example embodiments and explain various principles and advantages, in accordance with the inventive concepts wherein.

Figure 1:
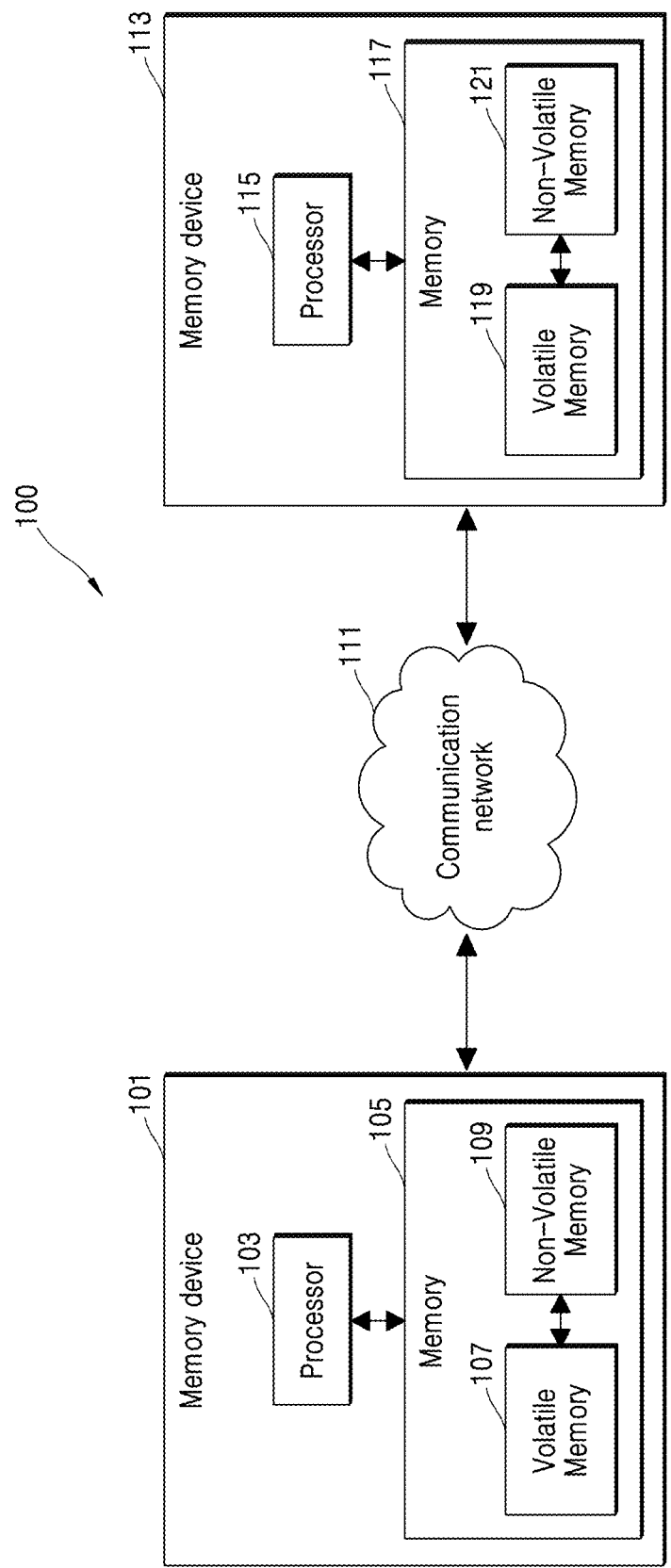
FIG. 1 shows an example environment 100 in which the techniques of repairing a Dynamic Random Access Memory (DRAM) may be implemented, in accordance with some example embodiments of the inventive concepts.

It should be appreciated by those skilled in the art that any block diagrams herein represent conceptual views of the illustrative systems embodying the principles of one or more example embodiments of the inventive concepts. Similarly, it will be appreciated that any flowcharts, flow diagrams, state transition diagrams, pseudo code, and the like represent various processes which may be substantially represented in computer readable medium and executed by a computer and/or processor, whether or not such computer and/or processor is explicitly shown.

DETAILED DESCRIPTION

In general, one or more DRAMs (e.g., DRAM chips) may be mounted on a single Dual In-Line Memory Module (DIMM), but the example embodiments are not limited thereto and other types of memory chips and/or memory modules may be used. The DIMMs may be mounted on a Printed Circuit Board (PCB) and designed for use in personal computers, workstations, printers, servers, and the like. The DIMM may include one or more channels, ranks, banks, and bank groups. A channel may be defined as a connection path between a memory controller and the DIMM. A rank may refer to a subset of the DRAM chips mounted on the DIMM. A DRAM chip may comprise 'M' rows and 'N' columns for storing data, where M and N are integers. A memory cell may be defined as the smallest form of data storage in the DRAM chip.

In at least one example embodiment of the inventive concepts, a "memory bank" or "bank" may be defined as a logical storage within a computer memory which may be used for storing and/or retrieving data and/or frequently used data, etc. In other words, the "memory bank" may be a set of independent arrays inside a DRAM chip. A bank group may be a collection of two or more memory banks.

In at least one example embodiment of the inventive concepts, a "spare row" or "redundant row" may be defined as an additional row of memory cells that may be used to replace a "faulty row" or "failed row" thereby, allowing the memory device to continue functioning even when a portion of its memory becomes corrupted and/or produces errors. In at least one example embodiment of the inventive concepts, a "faulty row" may be defined as a row of memory cells which comprise one or more errors and/or corrupted information. The one or more errors in the faulty row may be identified using error detecting technique(s), and the faulty row may be repaired using error correction technique(s). The one or more errors may be classified into correctable errors and/or uncorrectable or non-correctable errors.

The correctable errors may be easily corrected (e.g., by performing a parity check and/or using error-correcting codes, etc.). The correctable errors may be caused by "single-bit memory errors", a single-bit memory error refers to an error in one bit of data stored in memory. On the other hand, the uncorrectable errors (which are caused by "multi-bit memory errors", etc.) may not be detected and/or may not be easily corrected and thus may cause permanent damage to a memory device, or may indicate that the memory device is permanently damaged, etc. A multi-bit error may refer to an error in a plurality of bits of data stored in the memory.

In the current Dynamic Random Access Memory (DRAM) memories there are a limited number of spare rows per bank group (e.g., one spare row per bank group) which may not be sufficient to repair a faulty DRAM memory device. For instance, in the hard PPR, whenever a multi-bit error is identified in a faulty row associated with a particular bank group, the faulty row is mapped to an available spare row. However, if multi-bit errors are identified in other faulty rows associated with the particular bank group, then the other faulty rows may not be capable of being repaired by mapping them with the spare rows because there is only one spare row per bank group which has already been mapped to the faulty row. Hence, the other faulty rows are discarded, disabled and/or not further used. Additionally, whenever correctable errors are identified in a faulty row and the occurrence of correctable errors exceeds a desired threshold (e.g., the correctable errors are beyond the correction capabilities of the DRAM memory device, etc.), rank sparing may be performed, in which the entire rank is mapped to another, unused rank, etc. In these scenarios, a complete Rank/DIMM/Channel becomes unused (e.g., retired, disabled, etc.), and if another faulty row is identified, there will be no spare memory for repairing the new faulty row. To repair such DRAMs and/or DIMMs, one has to manually replace the DRAMs and/or DIMMs, etc.

To solve some or all of the above-identified problems, at least one example embodiment of the inventive concepts discloses techniques for dynamically increasing (or decreasing) the number of spare rows using Basic Input Output System (BIOS) boot menu of a memory device for repairing faulty DRAMs, thereby decreasing and/or eliminating the need of replacing the faulty DRAMs/DIMMs and improving and/or extending the life cycle of the DIMMs/DRAMs.

FIG. 1 shows an example environment 100 in which the techniques for repairing a Dynamic Random Access Memory (DRAM) may be implemented, in accordance with some example embodiments of the inventive concepts, but the example embodiments are not limited thereto, and the disclosed techniques may be applied to other types of memories, such as Static RAM (SRAM), etc. The example environment 100 may comprise at least one memory device 101 in communication with at least one second memory device 113 through at least one communication network 111. As an example, the memory devices 101, 113 may be, without limitation, a mobile phone, a smartphone, a tablet, a computer or desktop, a laptop, a personal digital assistant (PDA), a server, and the like. The memory device 101 may include at least one processor 103 communicatively coupled with a memory 105. Similarly, the memory device 113 may include at least one processor 115 communicatively coupled with a memory 117.

The processors 115, 103 may include one or more memory controllers (not shown in FIG. 1). The memory 105 may include, without limitation, at least one Volatile Memory (VM) 107 and/or at least one Non-Volatile Memory (NVM) 109, etc. Likewise, the memory 117 may include, without limitation, at least one VM 119 and/or at least one NVM 121, etc. As an example, the VMs 107, 119 may include, without limitation, a Random Access Memory (RAM), a cache memory, and the like. As an example, the NVMs 109, 121 may include, without limitation, a flash memory, an optical disc, a hard disc, a floppy disc, a magnetic tape, and the like.

The communication network 111 may comprise a data network such as, but not restricted to, the Internet, a Local Area Network (LAN), a Wide Area Network (WAN), and/or a Metropolitan Area Network (MAN), etc. In certain example embodiments, the communication network 111 may include a wireless network, such as, but not restricted to, a cellular network, and/or a satellite network, etc., and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS), etc. In at least one example embodiment, the communication network 111 may include or otherwise cover networks and/or subnetworks, each of which may include, for example, a wired and/or wireless data pathway. The communication network 111 may comprise servers, routers, bridges, switches, and/or other similar equipment used to facilitate communication between the two memory devices 101, 113.

The VMs 107, 119 may comprise a Dynamic Random Access Memory (DRAM) such as a Double Data Rate 5 (DDR5) RAM, but the example embodiments are not limited thereto. The forthcoming paragraphs now describe techniques of repairing a DRAM of the memory device 101. However, the example embodiments of the inventive concepts are not limited thereto, and in general the techniques of memory repairing described in the example embodiments of the inventive concepts may be used to repair DRAM(s) of any type of memory devices, etc.

Figure 2:
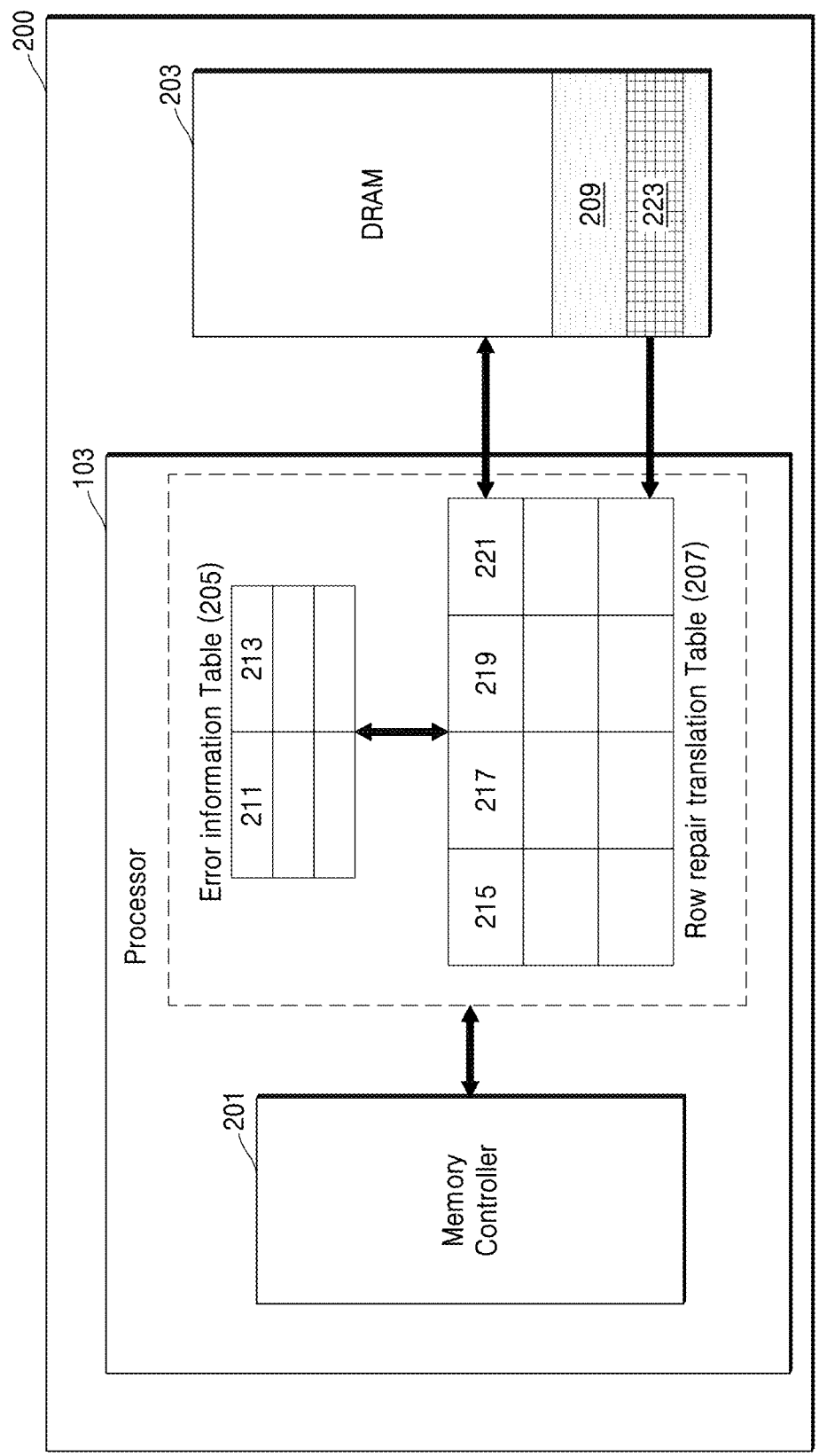
FIG. 2 shows a high-level block diagram 200 of a memory device 101, in accordance with some example embodiments of the inventive concepts.

Referring to FIG. 2 which shows a high-level block diagram 200 of the memory device 101 comprising the processor 103, in accordance with some example embodiments of the inventive concepts. As shown in FIG. 2, the processor 103 may comprise a memory controller 201. The memory controller 201 may be any digital circuit for managing flow of data, information, and/or content going to and/or coming out from a memory of the memory device 101 (for example, the DRAM 203 of the memory device 101, etc.). In FIG. 2, it is shown that the memory controller 201 is within the processor 103. However, the example embodiments of the inventive concepts are not limited thereto and in at least one example embodiment, the memory controller 201 may be external to the processor 103 and communicatively coupled with the processor 103 and/or the DRAM 203, etc. In at least one example embodiment, the memory controller 201 the processor 103 may be either integrated on the same semiconductor chip or may be implemented on separate semiconductor chips, etc.

The memory controller 201 may maintain one or more tables, e.g., an error information table 205 and/or a row repair translation table 207, etc., but is not limited thereto. The error information table 205 may comprise at least two columns and/or fields 211, 213 (also referred to as first and second columns and/or fields) and a plurality of rows. Each row may comprise information regarding and/or related to at least one correctable faulty row in the first column 211 (e.g., address of the correctable faulty row including at least one of a channel address, rank information, a bank and bank group information, etc.) and/or a corresponding error count of the correctable faulty row in the second column 213, etc., but the example embodiments are not limited thereto. In other words, the error information table 205 may comprise a physical address of the correctable faulty row, but is not limited thereto. The error count indicates a detected number of correctable errors stored in the correctable faulty row. The error count corresponding to the correctable faulty row may be incremented whenever a correctable error is detected in the correctable faulty row. When the error count exceeds a specified threshold value (e.g., a desired error threshold, etc.), the correctable faulty row may be mapped with an available spare row.

The row repair translation table 207 may comprise a plurality of rows and at least one of four or more columns or fields 215, 217, 219, and 221 (namely a first field 215, a second field 217, a third field 219, and/or a fourth field 221, etc.). The first, second, and third fields of a particular row of the row repair translation table 207 may comprise information about and/or related to a particular spare row. Particularly, the first field 215 may comprise an identifier of the particular spare row, the second field 217 may comprise a status identifier indicating whether the particular spare row is available for mapping to a faulty row or not, and/or the third field 219 may comprise a fault identifier indicating whether the particular spare row itself is faulty or non-faulty, etc. The fourth field 221 may comprise information about and/or related to a faulty row which is mapped to the particular spare row (e.g., an identifier of the faulty row which is mapped to the particular spare row). If no faulty row is mapped to the particular spare row, the fourth field may be blank, etc. It may be noted that an identifier of a particular faulty row or a particular spare row may indicate a physical address of the particular faulty row or the particular spare row, but is not limited thereto.

In at least one example embodiment, during design and/or manufacturing of the DRAM 203, a designer and/or manufacturer may allocate a desired and/or maximum memory space 209 within the DRAM 203. The desired and/or maximum memory space 209 may comprise a desired number of spare rows for the purpose of repairing the DRAM 203. As an example, the designer may design the DRAM to have a capacity of 1 TB, and then may reserve 300 MB as the desired and/or maximum memory space 209. Within the desired and/or maximum memory space 209, the processor 103 may reserve at least one particular memory space 223 (e.g., reserved memory space, etc.) using the Basic Input and Output System (BIOS) boot menu of the memory device 101. The reserved memory space 223 may comprise a plurality of spare rows for repairing the DRAM 203. The size of the reserved memory space 223 may be user configurable (e.g., the user may increase or decrease the size of the reserved memory space 223 from the BIOS boot menu to function as space for spare rows), but the example embodiments are not limited thereto. At any given time, the reserved memory space 223 should not exceed the desired and/or maximum memory space 209, and also should not exceed a size of the row repair translation table 207 maintained by the memory controller 201, etc. The processor 103 and/or memory controller 201 may be aware of address ranges corresponding to the reserved memory space 223 and the desired and/or maximum memory space 209, which should not fall in address range of system memory (e.g., memory used for data storage and/or system operation, or in other words, non-reserved memory space, etc.).

Once the memory device 101 is powered ON, the processor 103 may initiate memory scanning and/or testing for identifying one or more faulty rows within the DRAM 203 using at least one memory testing method. The at least one memory testing method may include, an on-die Error Correction Code (ECC) memory testing method, an Error Check and Scrub (ECS) memory testing method, a side band ECC memory testing method, memtest, and/or patrol scrubs, etc., but are not limited thereto. As an example, the ECS may allow early detection of possible DRAM failures to avoid and/or reduce downtime. In general, memtest is a RAM tester that runs under an Operating System (OS). The memtest may verify whether the memory device 101 may reliably store and/or retrieve data from the DRAM 203. In other words, the memtest is a software utility (e.g., an open-source software utility, a closed source software utility, etc.) which may scan and/or test RAM in the memory device 101 for any defects and/or errors. The patrol scrubs may proactively scan system memory e.g., DRAM 203, detect correctable errors, and/or consequently repair the correctable errors. Hence, the patrol scrubs may decrease and/or prevent accumulation of single-bit errors in faulty rows. If the patrol scrubs fail to fix detected and/or identified memory errors, it indicates that a permanent fault has occurred in the applicable row.

After or during identification of the one or more faulty rows within the DRAM 203, the processor 103 may classify each of the identified faulty rows as a correctable faulty row (for example, a row with one or more single bit errors, etc.) or an uncorrectable faulty row (for example, a row with at least one multiple-bit error, etc.) using one or more of the aforementioned memory testing methods, etc. If an identified faulty row is determined to be a correctable faulty row, then the processor 103 may verify whether the identified correctable faulty row is present in the error information table 205 maintained by the memory controller 201. If the identified correctable faulty row is present within the error information table 205, then an error count corresponding to the identified correctable faulty row is incremented, and when the error count reaches or exceeds a desired and/or predefined threshold value, the correctable faulty row may be mapped with an available spare row in the row repair translation table 207 and the entry of the correctable faulty row may be deleted from the error information table 205 and/or overridden by a new correctable faulty row.

When the identified correctable faulty row is not present within the error information table 205, then information corresponding to that particular correctable faulty row may be added to the error information table 205. For instance, the error information table 205 (e.g., the first and second fields 211, 213, etc.) may be populated and/or updated with a memory address and/or identifier of the particular correctable faulty row, and count of the correctable errors in the particular correctable faulty row, etc.

When the error count of the particular correctable faulty row reaches the desired threshold value or exceeds the desired threshold value, the processor 103 may check for an available spare row using the status identifier field 217 of the row repair translation table 207. Subsequently, the processor 103 may check if the available spare row itself is faulty or not (e.g., using the fault identifier field 219, etc.) and upon detecting an available non-faulty spare row, the processor 103 may map the particular correctable faulty row to the available non-faulty spare row within the row repair translation table 207. For example, if a value of status field is, e.g., '1' for a spare row, it means the spare row is not available for mapping and the particular faulty row is not mapped to the spare row, but the example embodiments are not limited thereto. Conversely, if the value of status field is, e.g., "0" for a spare row, it means the spare row is available for mapping and the particular faulty row may be mapped to the available spare row, but the example embodiments are not limited thereto. In at least one example embodiment, before mapping the particular faulty row to the available spare row, the processor 103 may determine whether the available spare row itself is faulty or non-faulty. For example, the processor 103 may use the faulty identifier and/or third field 219 of the row repair translation table 207 to identify whether the available spare row itself is faulty or non-faulty. Upon determining that the spare row is faulty, the processor 103 may exclude the faulty spare row from the plurality of spare rows for mapping to the faulty row. In other words, the faulty spare row may not be used for mapping the faulty row with the spare rows of the plurality of spare rows. In at least one example embodiment, when the value of fault identifier field is "0" for the spare row means the spare row is non-faulty, and when the value of fault identifier is "1" for the spare row means the spare row is faulty, but the example embodiments are not limited thereto. In at least one example embodiment, any different type of identifier (e.g., other than "1" and "0") may be used for indicating an availability and/or fault status of spare rows.

When multiple single bit errors are identified in the particular correctable faulty row, then the particular correctable faulty row has potential to become hard error (and/or permanent error, etc.) and hence needs to be repaired by mapping it to an available spare row within the row repair translation table 207. In at least one example embodiment, when there are no spare rows available for mapping in the row repair translation table 207, then at least one processor 103, either automatically or based on at least one input from the user, may increase the number of rows included in the reserved space 223 and/or the number of spare rows from the BIOS boot menu of the memory device 101, e.g., by rebooting the memory device 101, etc. . . .

After mapping the correctable faulty row with the available spare row of the plurality of spare rows, the processor 103 may store mapping information in the row repair translation table 207 maintained by the memory controller 201, and the mapping information may indicate an association between the correctable faulty row and/or the mapped spare row, etc. Subsequently, the processor 103 may copy and/or write data, information, and/or content of the correctable faulty row into the mapped spare row, etc.

Additionally, if the faulty row is identified as an uncorrectable faulty row, then the processor 103 may directly map the uncorrectable faulty row with an available spare row of the plurality of spare rows after checking availability and fault status of the spare rows, and may store the mapping information in the row repair translation table 207 maintained by the memory controller 201. Subsequently, the processor 103 may copy and/or write the data, information, and/or content of the uncorrectable faulty row into the mapped spare row, etc.

In at least one example embodiment, when the processor 103 receives a request to access data stored in one or more rows of the DRAM 203, the processor 103 may first determine whether any of the one or more rows matches with any faulty row. If any of the requested rows matches with a faulty row, then the processor 103 may redirect the request to corresponding mapped spare row using the mapping information stored in the row repair translation table 207 and fetch the requested content, information, and/or data, etc.

In at least one example embodiment, when the memory device 101 is turned off, e.g., at the end of a power cycle, the error information table 205 and/or the row repair translation table 207 may be stored in a NVM, such as a Serial Presence Detect (SPD), NVRAM, and/or any other NVM present in the processor and/or DIMM 103, etc. Further, when the memory device 101 is powered ON during a next power cycle, the error information table 205 and/or the row repair translation table 207 may be restored and populated and/or updated with the previous mapping information from the NVM, etc. Specifically, when the memory controller 201 saves a copy of the error information table 205 and/or the row repair translation table 207 in the NVM, the memory controller 201 may set one or more particular locations within the NVM to indicate whether faulty row mapping information of the tables 205, 207 is saved or not. During the reboot of the memory device 101, as part of memory initialization, the particular locations of the NVM 109 may be read to determine if the faulty row information is present or not. If yes, the memory controller 201 may restore the tables 205, 207 using the stored faulty row information. This decreases and/or avoids the need to freshly generate the tables 205, 207 on each reboot.

Figure 3:
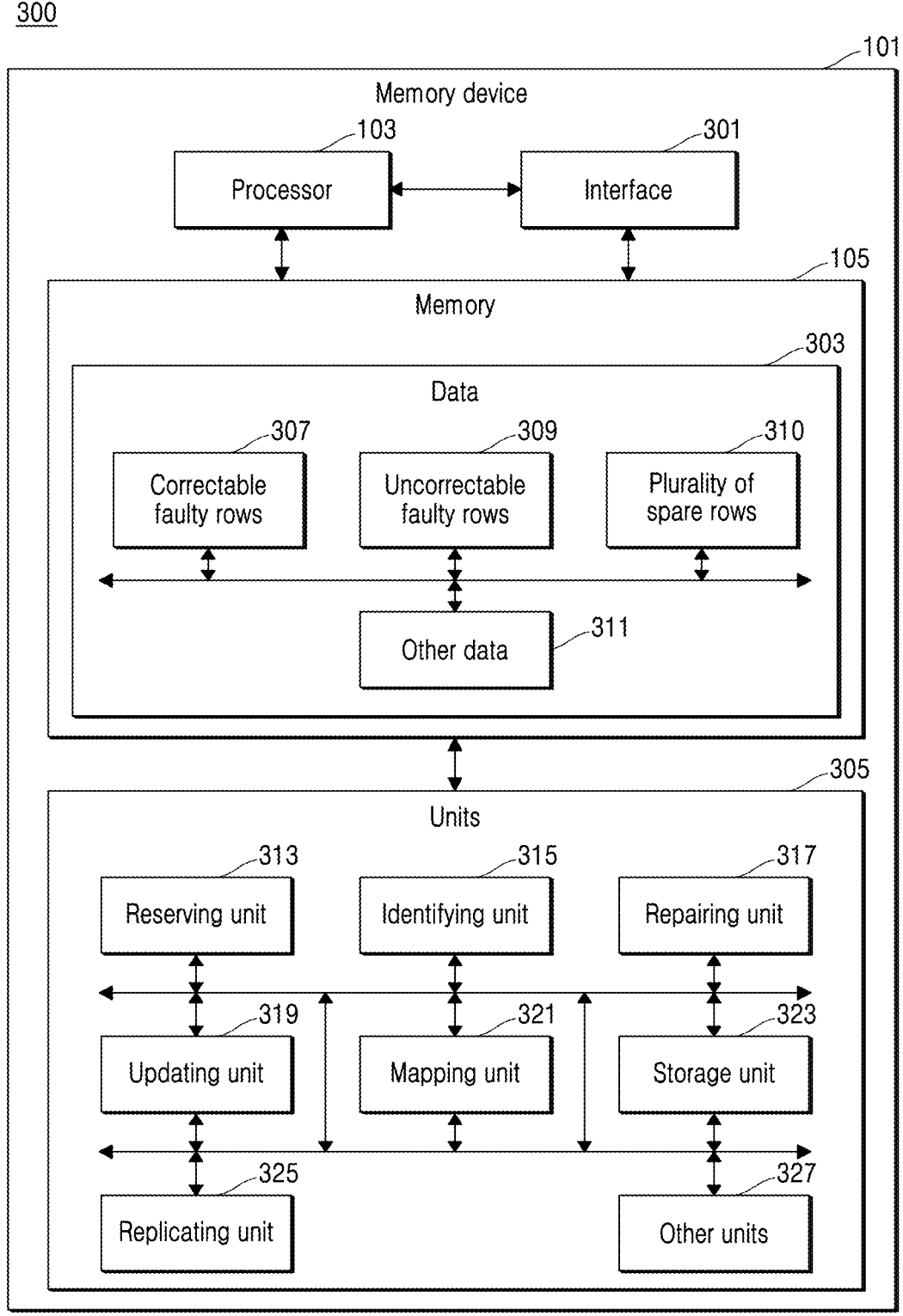
FIG. 3 shows a detailed block diagram 300 of the memory device 101, in accordance with some example embodiments of the inventive concepts.

FIG. 3 shows a detailed block diagram 300 of the memory device 101, in accordance with some example embodiments of the inventive concepts. The memory device 101 may comprise the processor 103, at least one interface 301, the memory 105, and/or one or more units 305, etc., but the example embodiments are not limited thereto, and for example, there may be a greater or lesser number of constituent components included in the memory device 101. The memory 105 may include various types of data 303 including correctable faulty rows 307, uncorrectable faulty rows 309, plurality of spare rows 310, and/or other data 311, etc. The other data 311 may include one or more files, system data, user data, temporary files, one or more instructions, the desired and/or predefined threshold value, etc., but are not limited thereto.

In at least one example embodiment, the one or more units 305 may include a reserving unit 313, an identifying unit 315, a repairing unit 317, an updating unit 319, a mapping unit 321, a storage unit 323, a replicating unit 325, and/or other units 327. In at least one example embodiment, the units 305 may be dedicated hardware processing circuits, processing sub-circuits, modules, units, etc., capable of executing one or more instructions stored in the memory 105 for performing various operations of the memory device 101. In at least one other example embodiment, the units 305 may be software modules stored in the memory 105 which may be executed by the at least one processor 103 for performing the operations of the memory device 101, etc. According to at least one example embodiment, the reserving unit 313, identifying unit 315, repairing unit 317, updating unit 319, mapping unit 321, storage unit 323, replicating unit 325, and/or other units 327 may be implemented as processing circuitry, and may include hardware including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

In at least one example embodiment, the reserving unit 313 may be configured to reserve the memory spaces 209, 223 within the DRAM 203 of the memory device 101. The identifying unit 315 may be configured to identify one or more faulty rows within the DRAM 203 using at least one memory testing method and/or classify the identified one or more faulty rows into correctable faulty rows 307 and/or uncorrectable faulty rows 309.

In at least one example embodiment, the repairing unit 317 may be configured to repair the correctable and/or uncorrectable faulty rows, and the updating unit 319 may be configured to update the error information table 205 and/or the row repair translation table 207. In at least one example embodiment, the mapping unit 321 may be configured to map the correctable/uncorrectable faulty rows 307 with available spare rows 310, and the storage unit 323 may be configured to store the row repair translation table 207 and/or the error information table 205, etc. The replicating unit 325 may be configured to copy data of the correctable/uncorrectable faulty rows 307 into the available spare rows 310. The other units 327 may be used to perform various miscellaneous functionalities of the memory device 101. It will be appreciated that the one or more units 305 may be implemented as a single unit or a combination of different units.

Figure 4:
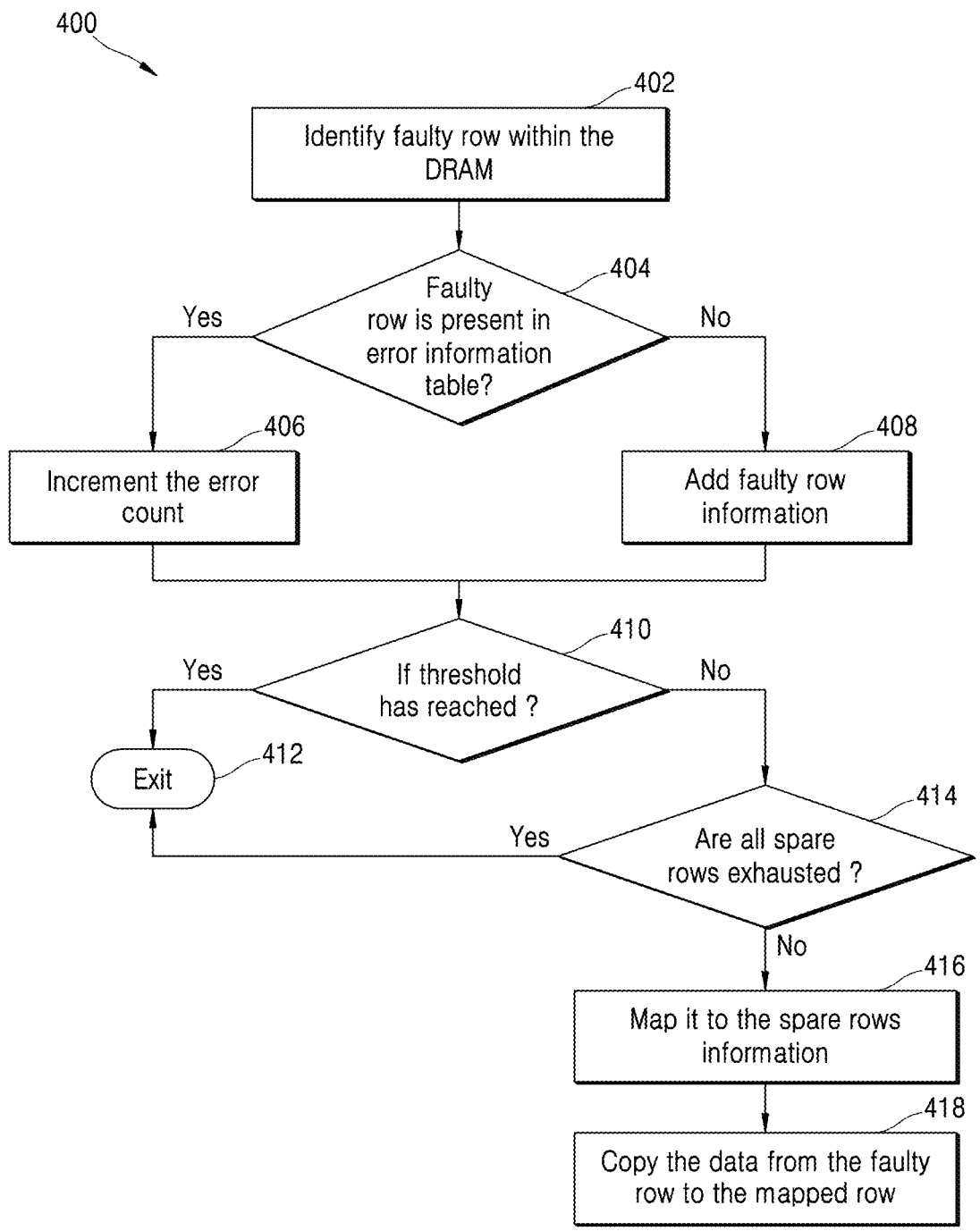
FIG. 4 depicts a flowchart illustrating a method 400 for repairing a DRAM 203 during normal operation of the memory device 101, in accordance with some example embodiments of the inventive concepts.

FIG. 4 depicts a flowchart illustrating a method 400 for repairing a DRAM 203 during a normal operation of the memory device 101, in accordance with some example embodiments of the inventive concepts.

As illustrated in FIG. 4, at block 402, the processor 103 may identify at least one faulty row (e.g., correctable faulty row) within the DRAM 203 of the memory device 101, e.g., using at least one memory testing method. At block 404, the processor 103 may determine whether faulty row information associated with the identified at least one faulty row (e.g., information related to the identified faulty row) is present in an error information table 205. If the processor 103 determines that the faulty row information associated with the identified at least one faulty row is present in the error information table 205, then the method moves to block 406. Alternatively, if the processor 103 determines that the faulty row information associated with the identified at least one faulty row is not present in the error information table 205, then the method moves to block 408.

At block 406, when the faulty row information associated with the identified at least one faulty row is present or identified in the error information table 205, then a corresponding error count associated with the identified at least one faulty row within the error information table 205 may be incremented. At block 408, when the faulty row information is not present in the error information table 205, the information of the identified faulty row may be populated, updated, and/or added to the error information table 205.

At block 410, the processor 103 may determine whether any error count value associated with any fault row information stored in the error information table 205 has reached a desired and/or predefined error threshold value or not. If the error count value has not reached the desired and/or predefined error threshold value, then the method moves to block 412 and the process may exit (e.g., stop). If the error count value has reached the desired error threshold value then the method moves to block 414.

At block 414, the processor 103 may determine whether all of the plurality of spare rows 310 of the row repair translation table 207 are in use, occupied and/or exhausted (e.g., determine if there are any spare rows available, etc.). If the processor determines that there are no available spare rows 310 in the row repair translation table 207, e.g., all spare rows 310 are in use, occupied, exhausted, and/or unavailable, etc., the method 400 moves to block 412 and the process may exit.

At block 416, when all the plurality of spare rows 310 are not exhausted (e.g., there is at least one spare row available), the processor 103 may map the faulty row with an available spare row and populate and/or update the row repair translation table 207. At block 418, after mapping the faulty row with the spare row, the processor 103 may copy data from the faulty row to the mapped spare row, etc.

Figure 5:
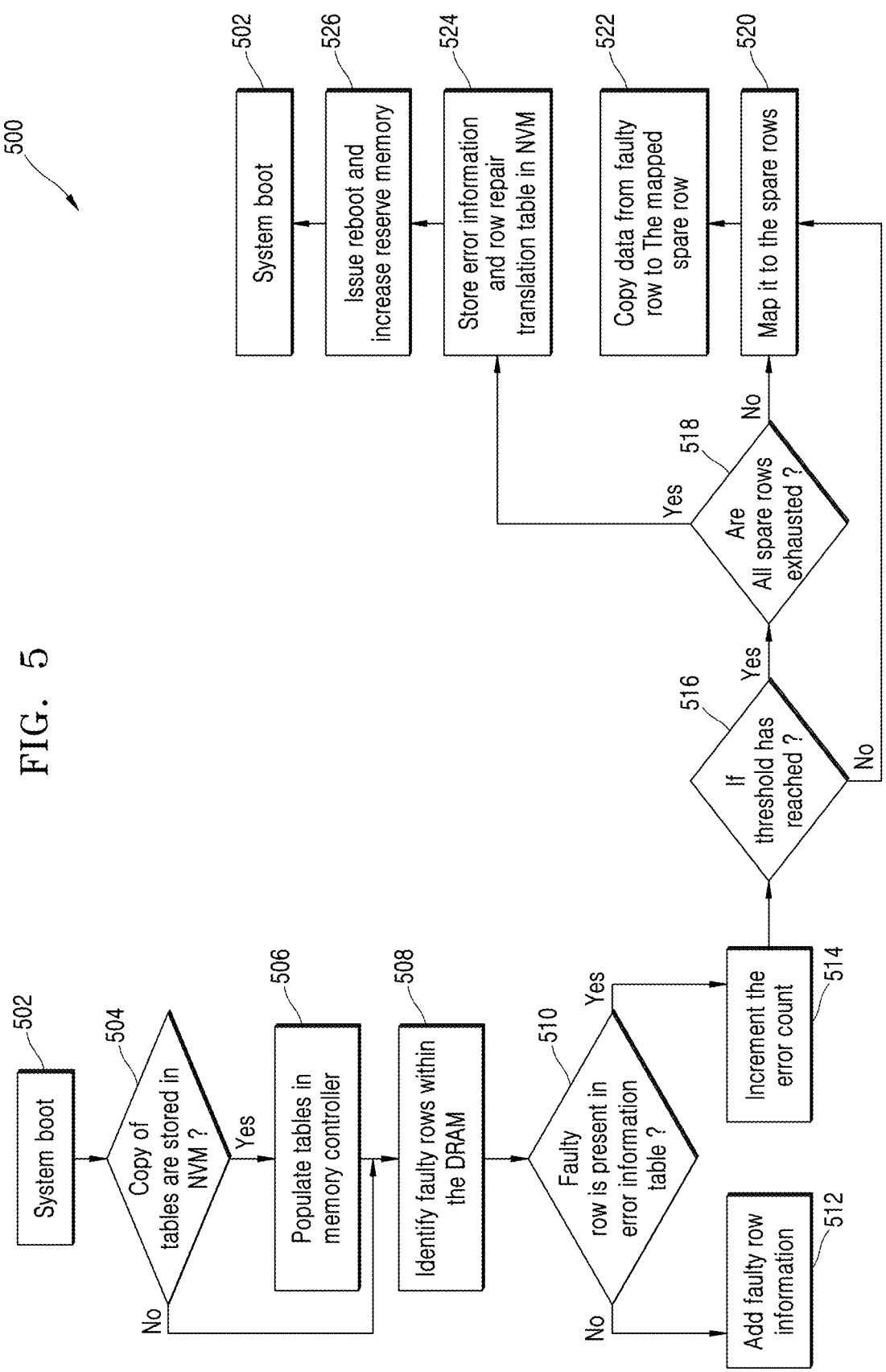
FIG. 5 depicts a flow chart illustrating a method 500 for repairing a DRAM 203 device during a power cycle of the memory device 101, in accordance with some example embodiments of the inventive concepts.

FIG. 5 depicts a flow chart illustrating a method 500 for repairing a DRAM 203 during a power cycle of the memory device 101, in accordance with some example embodiments of the inventive concepts.

At block 502, a system (e.g., computer system, computer device, etc.) is rebooted. In an implementation, the system may be the memory device 101 including the DRAM 203, but the example embodiments are not limited thereto. During the reboot of the memory device 101, the processor 103 may determine whether a copy of the error information table 205 and/or the row repair translation table 207 is stored in a NVM (block 504). If the copy of the error information table 205 and/or the row repair translation table 207 is stored in the NVM, then the error information table 205 and/or the row repair translation table 207 may be populated, updated, and/or restored in the memory controller 201 as indicated in block 506. If the copy of error information table 205 and/or the row repair translation table 207 is not stored in the NVM, then the method moves to block 508. In block 508, the processor 103 may then perform the operations of block 508 to block 522, similar to the operations of blocks 402-418 as discussed in connection with FIG. 4, which are not repeated here for the sake of brevity.

At block 524, in response to the processor 103 determining that all spare rows have been exhausted in block 518, the processor 103 may store the error information table 205 and/or the row repair translation table 207 in the NVM. At block 526, the processor 103 may issue a reboot instruction in response to all of the plurality of spare rows 310 being exhausted (e.g., unavailable, etc.), and may increase the reserved memory space 223 in the DRAM 203 of the memory device 101 during the reboot operation.

Figure 6:
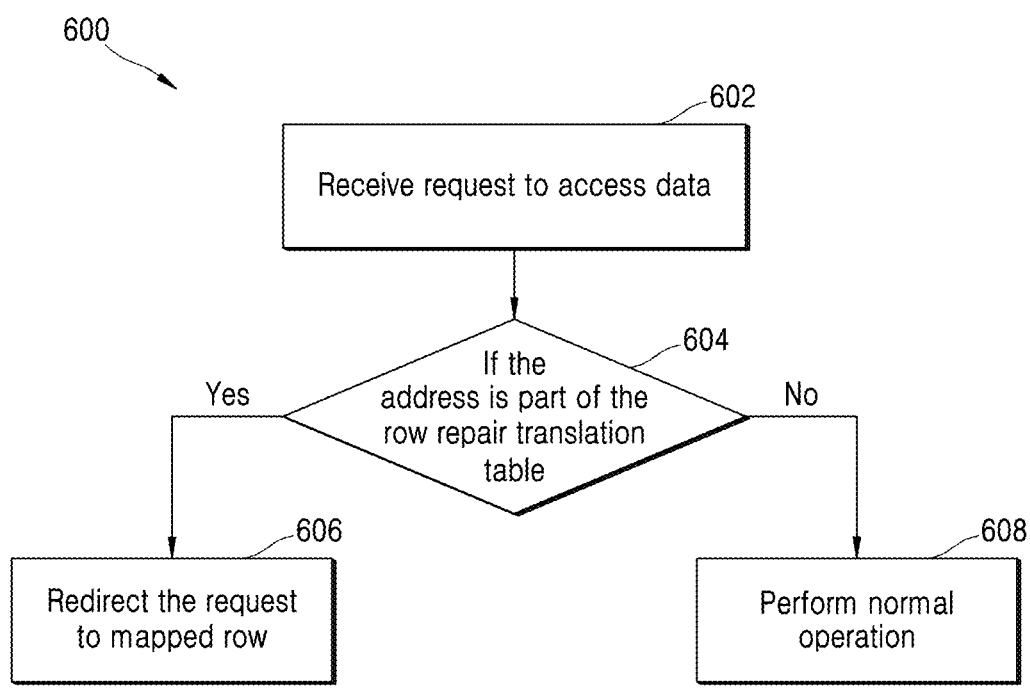
FIG. 6 depicts a flow chart illustrating a method 600 for performing read/write operations to access data stored in the DRAM 203, in accordance with some example embodiments of the inventive concepts.

FIG. 6 depicts a flow chart illustrating a method 600 for performing at least one read/write operation to access data stored in the DRAM 203, in accordance with some example embodiments of the inventive concepts.

As illustrated in FIG. 6, at block 602, the method comprises the processor 103 receiving a request to access data stored in a row of the DRAM 203, wherein the request may comprise an address (e.g., memory address, physical address, logical address, etc.) of the row. As an example, the processor 103 may receive a request and/or instruction to read and/or write data in at least one row of the DRAM 203.

At block 604, the method comprises the processor 103 determining whether the requested row address matches with any faulty row address present in the row repair translation table 207. If the address of the requested row matches with a faulty row, then the processor 103 may redirect the request to a corresponding mapped spare row as indicated in block 606 for accessing the data of the requested row. Conversely, if the address of the requested row does not match with any faulty row present in the row repair translation table 207, then the processor 103 may consider the request as a normal data read/write operation and may perform a normal data read/write operation on the DRAM 203, as shown in block 608.

Figure 7:
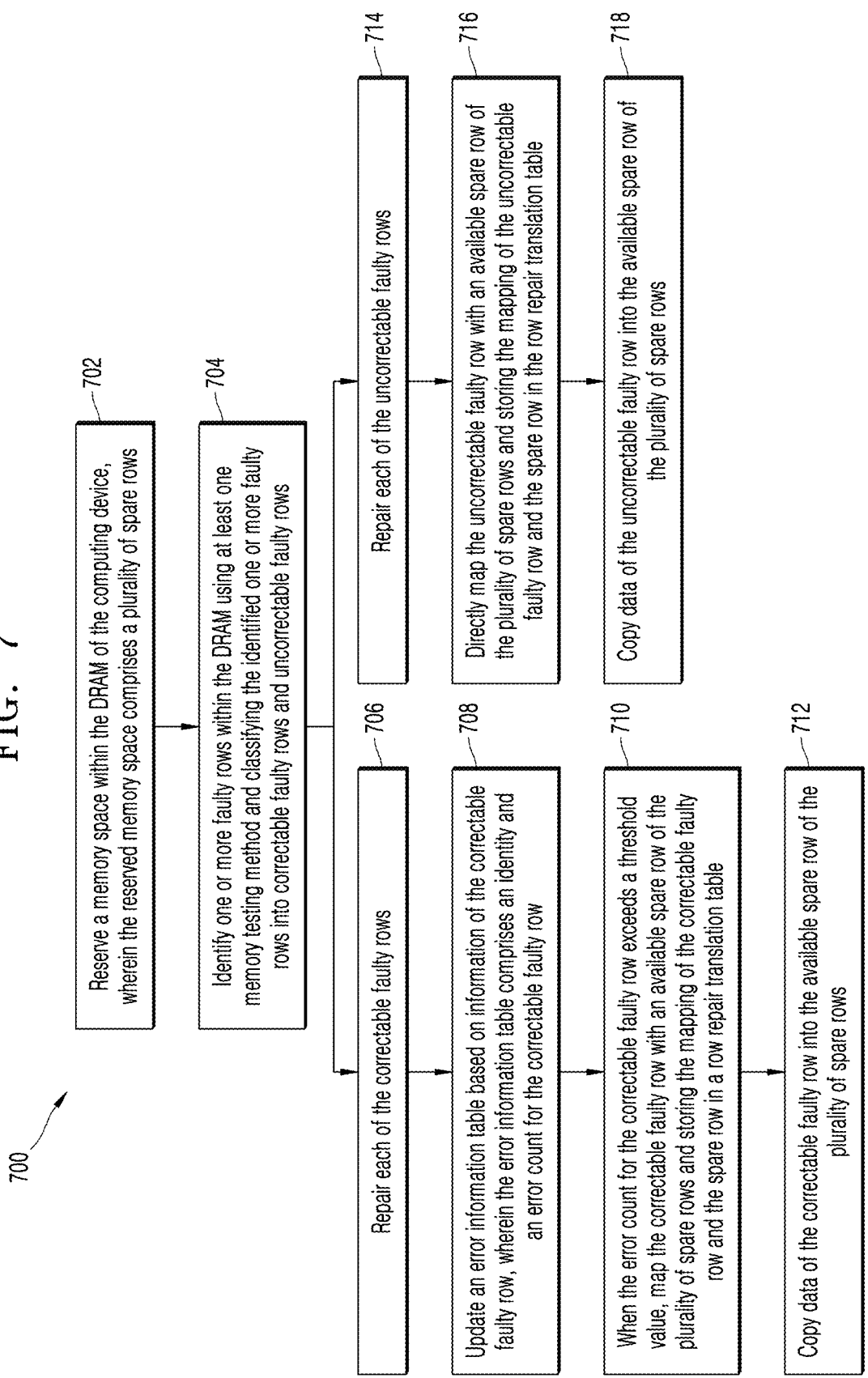
FIG. 7 depicts a flowchart illustrating a method 700 for repairing a DRAM 203 of the memory device 101, in accordance with some example embodiments of the inventive concepts.

FIG. 7 depicts a flowchart illustrating a method for repairing a DRAM 203 of the memory device 101, in accordance with some example embodiments of the inventive concepts. The various operations of method 700 may be implemented by the processor 103 in conjunction with the memory controller 201 of the memory device 101 or by the one or more units 305, as shown in FIG. 3, etc., but the example embodiments are not limited thereto.

At block 702, the method 700 comprises the processor 103 reserving a memory space 223 within the DRAM 203 of the memory device 101, where the reserved memory space 223 comprises a plurality of spare rows 310.

At block 704, the method 700 comprises the processor 103 identifying one or more faulty rows within the DRAM 203 using at least one memory testing method, and classifying the identified one or more faulty rows into correctable faulty rows 307 and uncorrectable faulty rows 309. In at least one example embodiment, the at least one memory testing may include, without limitation, an on-die Error Correction Code (ECC) memory testing method, an Error Check and Scrub (ECS) memory testing method, a side band ECC memory testing method, a memtest, and/or a patrol scrub, etc.

In at least one example embodiment, the operation of block 704, e.g., classifying the identified one or more faulty rows into correctable faulty rows and uncorrectable faulty rows may comprise the processor 103 classifying an identified faulty row as a correctable faulty row when all errors within the identified faulty row are correctable errors, and classifying an identified faulty row as an uncorrectable faulty row when at least one error within the identified faulty row is a multibit error, etc., but the example embodiments are not limited thereto.

At block 706, the method 700 comprises the processor 103 repairing each of the correctable faulty rows by performing the operations described in blocks 708, 710, and/or 712 for each of the correctable faulty rows. At block 708, the method 700 includes the processor 103 updating an error information table 205 based on information of the correctable faulty row, where the error information table 205 comprise at least two columns or fields 211, 213 and a plurality of rows. Each row may comprise information about an identity and/or address of the correctable faulty rows in the first column 211 and a corresponding error count of the correctable faulty row 307 in the second column 213, etc.

At block 710, the method 700 comprises, when the error count for the correctable faulty row exceeds a desired threshold value, mapping, by the processor 103, the correctable faulty row with an available spare row of the plurality of spare rows 310 and storing the mapping of the correctable faulty row and the spare row in a row repair translation table 207. As an example, the mapping is performed when an error count (e.g., a count of correctable errors in the correctable faulty row) for the correctable faulty row exceeds a desired and/or predefined threshold value. At block 712, the method

700 comprises the processor 103 copying data of the correctable faulty row into the available spare row of the plurality of spare rows 310.

At block 714, the method 700 comprises the processor 103 repairing each of the uncorrectable faulty rows by performing the operations described in blocks 716 and 718 for each of the correctable faulty rows. At block 716, the method 700 comprises the processor 103 mapping and/or directly mapping the uncorrectable faulty row with an available spare row of the plurality of spare rows 310 and storing the mapping of the uncorrectable faulty row and the spare row in the row repair translation table. At block 718, the method 700 comprises the processor 103 copying data from the uncorrectable faulty row into the available spare row of the plurality of spare rows 310.

In at least one example embodiment, the method 700 further comprises the processor 103 receiving a request to access data stored in at least one row of the DRAM 203 and determining whether the requested row matches with any of the one or more faulty rows. Specifically, the processor 103 checks whether an address of the requested row matches with an address of any of the one or more faulty rows stored in the error information table 205. When the requested row matches with a faulty row of the one or more faulty rows, the processor 103 may redirect the received request to a corresponding mapped spare row based on mapping of the faulty row and the mapped spare row stored in the row repair translation table 207.

Further, the method 700 comprises the processor 103 determining whether any row of plurality of spare rows 310 of the reserved memory space 223 is faulty. In at least one example embodiment, the processor 103 may identify a spare row as the faulty row by checking a corresponding fault identifier from the row repair translation table 207. Upon determining that at least one row of the plurality of spare rows 310 is faulty, the processor 103 may exclude the at least one faulty spare row from the plurality of spare rows 310 for mapping the one or more faulty rows.

In at least one example embodiment, the method 700 comprises the processor 103 storing the error information table 205 and/or the row repair translation table 207 in a non-volatile memory (NVM) during a power cycle (e.g. system boot, system reboot, etc.) of the memory device 101. The method 700 further comprises the processor 103 restoring the error information table 205 and/or the row repair translation table 207 when the memory device 101 is powered on during a next power cycle, etc.

In at least one example embodiment, the method 700 comprises the processor 103 enabling the reserved memory space 223 from a Basic Input Output System (BIOS) boot menu of the memory device 101 and increasing or decreasing the reserved memory space 223 within the desired and/or maximum reserved space 209 of the DRAM 203 from the BIOS boot menu, in each power cycle of the memory device 101.

At least one example embodiment of the the inventive concepts may increase the number of spare rows by dynamically reserving memory rows within the DRAM as spare rows based on identification of faulty rows within the DRAM, system requirements, and/or user input, etc. As a result, an increase in the number of memory errors that may be repaired is realized, thereby improving the lifecycle and/or reliability of DRAMs and/or DIMMs.

At least one example embodiment of the inventive concepts may check and/or monitor fault statuses of the spare rows, and if a spare row is identified as faulty, the spare rows may not be used for use in mapping a faulty row, e.g., excluded from being used to repair a faulty row. As a result, the reliability of the spare rows may be improved because currently there is no such mechanism to check the fault status of the spare rows.

At least one example embodiment of the inventive concepts, may decrease and/or prevent data loss of the two tables by saving information of the two tables in an NVM in the memory device. During a reboot of the memory device, both tables may be populated and/or updated with the previous information so as to avoid the need to freshly generate the tables on each reboot of the memory device.

The proposed memory device, method and/or the system performing the claimed steps as discussed above are not routine, conventional, or well-known aspects in the art, as the claimed steps provide the aforesaid solutions to the technical problems existing in the conventional technologies. Further, the claimed steps clearly bring an improvement in the functioning of the device and/or system itself, as the claimed steps provide a technical solution to a technical problem.

The above methods 400, 500, 600, and/or 700 may be described in the general context of computer executable instructions. Generally, computer executable instructions may include routines, programs, objects, components, data structures, procedures, modules, and/or functions, etc., which perform specific functions or implement specific abstract data types.

The order in which the various operations of the methods are described is not intended to be construed as a limitation, and any number of the described method blocks may be combined in any order to implement the method. Additionally, individual blocks may be deleted from the methods without departing from the spirit and scope of the subject matter described herein. Furthermore, the methods can be implemented in any suitable hardware and/or combination of hardware and software and/or firmware, etc.

The various operations of methods described above may be performed by various hardware and/or software component(s) and/or module(s), including, but not limited to the processor 103 of FIG. 1 and the various other hardware components of FIG. 3, etc.

It may be noted here that the subject matter of some or all of the example embodiments described with reference to FIGS. 1-3 may be relevant for the methods and the same is not repeated for the sake of brevity.

In at least one example embodiment of the inventive concepts, one or more non-transitory computer-readable media may be utilized for implementing one or more of the example embodiments consistent with the inventive concepts. Certain aspects may comprise a computer program product for performing the operations presented herein. For example, such a computer program product may comprise a non-transitory computer readable media having computer readable instructions stored (and/or encoded) thereon, the computer readable instructions being executable by one or more processors to perform the operations described herein. For certain aspects, the computer program product may include packaging material, but is not limited thereto.

Various components, modules, and/or units are described in this disclosure to emphasize functional aspects of devices configured to perform the disclosed techniques, but do not necessarily require realization by different and/or separate hardware units. Rather, as described above, various units may be combined into a single hardware unit and/or provided by a collection of interoperative hardware units, including one or more processors as described above, in conjunction with suitable software and/or firmware.

We claim:

1. A method of repairing a Dynamic Random Access Memory (DRAM) memory device, the method comprising:
reserving a memory space within the DRAM memory device, the reserved memory space including a plurality of spare rows, an amount of the plurality of spare rows set based on a Basic Input Output System (BIOS) boot menu setting associated with the DRAM memory;
identifying one or more faulty rows within the DRAM memory device using at least one memory testing method;
classifying the identified one or more faulty rows into correctable faulty rows and uncorrectable faulty rows; and
repairing each of the classified correctable faulty rows by,
updating an error information table based on information of a respective classified correctable faulty row, the error information table including a row identifier corresponding to the respective classified correctable faulty row and an error count for the respective classified correctable faulty row,
in response to the error count for the respective classified correctable faulty row exceeding a desired threshold value, mapping the respective classified correctable faulty row to an available spare row of the plurality of spare rows,
storing the mapping of the respective correctable faulty row and the mapped spare row in a row repair translation table, and
copying data stored in the respective correctable faulty row into the mapped spare row.

2. The method as claimed in claim 1, further comprising:
repairing each of the classified uncorrectable faulty rows by,
mapping a respective classified uncorrectable faulty row to an available spare row of the plurality of spare rows,
storing the mapping of the respective classified uncorrectable faulty row and the mapped spare row in the row repair translation table, and
copying data stored in the respective classified uncorrectable faulty row into the mapped spare row.

3. The method as claimed in claim 1, wherein the classifying the identified one or more faulty rows into the correctable faulty rows and the uncorrectable faulty rows further comprises:
classifying the identified faulty row as the correctable faulty row in response to all errors within the identified faulty row being identified as correctable errors; and
classifying the identified faulty row as the uncorrectable faulty row in response to at least one error within the identified faulty row being identified as an uncorrectable error.

4. The method as claimed in claim 1, wherein the at least one memory testing method comprises at least one of:
an on-die Error Correction Code (ECC) memory testing method, an Error Check and Scrub (ECS) memory testing method, a side band ECC memory testing method, a memtest, a patrol scrub, or any combinations thereof.

5. The method as claimed in claim 1, wherein
the row repair translation table includes a plurality of rows;
each row of the plurality of rows includes at least a first field, a second field, a third field, and a fourth field;
the first field includes an identifier of a spare row of the plurality of spare rows;
the second field includes a status identifier corresponding to the spare row, the status identifier indicating whether the spare row is available for mapping;
the third field includes a fault identifier corresponding to the spare row, the fault identifier indicating whether the spare row is faulty; and
the fourth field includes an identifier of a faulty row which is mapped to the spare row.

6. The method as claimed in claim 1, further comprising:
receiving a request to access data stored in a row of the DRAM memory device;
determining whether the requested row corresponds to one or more identified faulty rows; and
in response to the requested row corresponding to one or more of the identified faulty rows, redirecting the received request to at least one mapped spare row corresponding to the requested faulty row based on mapping information of the requested faulty row stored in the row repair translation table.

7. The method as claimed in claim 1, further comprising:
determining whether any row of the plurality of spare rows of the reserved memory space is faulty; and
upon determining that at least one row of the plurality of spare rows is faulty, excluding the at least one faulty spare row from the plurality of spare rows.

8. The method as claimed in claim 1, further comprising:
storing the error information table and the row repair translation table in non-volatile memory during a current power cycle of the DRAM memory device; and
restoring the error information table and the row repair translation table to the DRAM memory device in response to the DRAM memory device being powered on during a next power cycle.

9. The method as claimed in claim 1, further comprising:
enabling the reserved memory space via the BIOS boot menu associated with the DRAM memory device; and
increasing or decreasing a number of spare rows included in the reserved memory space of the DRAM memory device from the BIOS boot menu.

10. A system for repairing a Dynamic Random Access Memory (DRAM) memory device, the system comprising:
DRAM memory; and
at least one processor communicatively coupled to the DRAM memory, the at least one processor configured to:
reserve a memory space within the DRAM memory, the reserved memory space including a plurality of spare rows, an amount of the plurality of spare rows set based on a Basic Input Output System (BIOS) boot menu setting associated with the DRAM memory;
identify one or more faulty rows within the DRAM memory using at least one memory testing method;
classify the identified one or more faulty rows into correctable faulty rows and uncorrectable faulty rows; and
repair each of the classified correctable faulty rows by:
updating an error information table based on information of a respective classified correctable faulty row, the error information table including an identifier corresponding to the respective classified correctable faulty row and an error count for the respective classified correctable faulty row,
in response to the error count for the respective classified correctable faulty row exceeding a desired threshold value, mapping the respective classified correctable faulty row to an available spare row of the plurality of spare rows, storing the mapping of the respective classified correctable faulty row and the mapped spare row in a row repair translation table, and copying data stored in the respective classified correctable faulty row into the mapped spare row.

11. The system as claimed in claim 10, wherein the at least one processor is further configured to repair each of the classified uncorrectable faulty rows by:

mapping a respective classified uncorrectable faulty row with an available spare row of the plurality of spare rows;

store the mapping of the respective classified uncorrectable faulty row and the mapped spare row in the row repair translation table; and copying data stored in the respective classified uncorrectable faulty row into the mapped spare row.

12. The system as claimed in claim 10, wherein the at least one processor is further configured to classify the identified one or more faulty rows into the correctable faulty rows and the uncorrectable faulty rows by:

classifying an identified faulty row as the correctable faulty row in response to all errors within the identified faulty row being identified as correctable errors; and classifying an identified faulty row as the uncorrectable faulty row in response to at least one error within the identified faulty row being identified as an uncorrectable error.

13. The system as claimed in claim 10, wherein the at least one memory testing method comprises at least one of:

an on-die Error Correction Code (ECC) memory testing method, an Error Check and Scrub (ECS) memory testing method, a side band ECC memory testing method, a memtest, a patrol scrub, or any combinations thereof.

14. The system as claimed in claim 10, wherein the row repair translation table includes a plurality of rows; and each row of the plurality of rows includes a first field, a second field, a third field, and a fourth field;

the first field includes an identifier of a spare row of the plurality of spare rows;

the second field includes a status identifier corresponding to the spare row, the status identifier indicating whether the spare row is available for mapping;

the third field includes a fault identifier corresponding to the spare row, the fault identifier indicating whether the spare row is faulty; and the fourth field includes an identifier of a faulty row which is mapped to the spare row.

15. The system as claimed in claim 10, wherein the at least one processor is further configured to:

receive a request to access data stored in a row of the DRAM memory;

determine whether the requested row corresponds to any of the one or more identified faulty rows; and upon determining that the requested row corresponds to a faulty row of the one or more identified faulty rows, redirect the received request to at least one mapped spare row corresponding to the requested faulty row based on mapping information of the requested faulty row stored in the row repair translation table.

16. The system as claimed in claim 10, wherein the at least one processor is further configured to:

determine whether any row of the plurality of spare rows of the reserved memory space is faulty; and upon determining that at least one row of the plurality of spare rows is faulty, excluding the at least one faulty spare row from the plurality of spare rows.

17. The system as claimed in claim 10, wherein the at least one processor is further configured to:

store the error information table and the row repair translation table in non-volatile memory during a current power cycle of the DRAM memory; and restore the error information table and the row repair translation table to the DRAM memory in response to the DRAM memory being powered on during a next power cycle.

18. The system as claimed in claim 10, wherein the at least one processor is further configured to:

enable the reserved memory space via the BIOS boot menu associated with the DRAM memory; and increase or decrease a number of spare rows included in the reserved memory space of the DRAM memory from the BIOS boot menu.

19. A non-transitory computer readable media for repairing a Dynamic Random Access Memory (DRAM) memory device, the non-transitory computer readable media comprising one or more computer readable instructions which, when executed by at least one processor, causes the at least one processor to:

reserve a memory space within the DRAM memory device, the reserved memory space including a plurality of spare rows, an amount of the plurality of spare rows set based on a Basic Input Output System (BIOS) boot menu setting associated with the DRAM memory;

identify one or more faulty rows within the DRAM memory device using at least one memory testing method;

classify the identified one or more faulty rows into correctable faulty rows and uncorrectable faulty row; and repair each of the classified correctable faulty rows by, updating an error information table based on information of a respective classified correctable faulty row, the error information table including an identifier corresponding to the respective classified correctable faulty row and an error count for the respective classified correctable faulty row, in response to the error count for the respective classified correctable faulty row exceeding a desired threshold value, mapping the respective classified correctable faulty row with an available spare row of the plurality of spare rows, storing the mapping of the respective classified correctable faulty row and the mapped spare row in a row repair translation table, and copying data stored in the correctable faulty row into the mapped spare row.

* * * * *